(12) United States Patent  
Garcia et al.

(10) Patent No.: US 7,926,398 B2
(45) Date of Patent: Apr. 19, 2011

(54) CUTTER WITH OPTICAL ALIGNMENT SYSTEM

(75) Inventors: Jaime E. Garcia, Jackson, TN (US); Joseph L. Jenkins, Jr., Jackson, TN (US); Jeffrey D. Weston, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 57 days.

(21) Appl. No.: 11/033,502

(22) Filed: Jan. 11, 2005

(65) Prior Publication Data

US 2005/0126356 A1 Jun. 16, 2005

Related U.S. Application Data

(63) Continuation of application No. 10/174,731, filed on Jun. 19, 2002, now abandoned.

(51) Int. Cl.
*B26D 7/00* (2006.01)
*B27B 5/20* (2006.01)
*B27B 5/29* (2006.01)

(52) U.S. Cl. ........ 83/520; 83/471.1; 83/490; 83/522.15; 362/89

(58) Field of Classification Search ............ 83/520, 83/521, 522.13, 522.15, 397, 471.2, 471.3, 83/477.1, 478, 486.1, 490, 522.16, 581; 362/89, 362/259, 287, 289; 30/123, 388, 390, 391; 33/286, DIG. 1

See application file for complete search history.

(56) References Cited

U.S. PATENT DOCUMENTS

| 299,619 | A | | 6/1884 | Carson |
|---|---|---|---|---|
| 408,790 | A | | 8/1889 | Butler |
| 411,925 | A | | 10/1889 | Linderman |
| 714,098 | A | | 11/1902 | Caldwell |
| 1,336,501 | A | | 4/1920 | Blanckensee |
| 1,388,110 | A | * | 8/1921 | Hallock ............ 33/348 |
| 1,476,238 | A | | 12/1923 | Bump |
| 1,730,938 | A | | 10/1929 | Kleeb et al. |
| 1,804,764 | A | | 5/1931 | Grant |
| 1,807,120 | A | | 5/1931 | Lewis |
| 1,993,219 | A | | 3/1935 | Merrigan |
| 2,095,330 | A | | 10/1937 | Hedgpeth |
| 2,109,976 | A | | 3/1938 | Pierce, Jr. |
| 2,121,069 | A | | 6/1938 | Collins |
| 2,146,906 | A | | 2/1939 | Moller |
| 2,299,262 | A | | 10/1942 | Uremovich |
| 2,307,820 | A | | 1/1943 | Butters |

(Continued)

FOREIGN PATENT DOCUMENTS

DE 3104340 A1 2/1982

(Continued)

OTHER PUBLICATIONS

Applications/Wood,Z-LASER.com, http://www.z-laser.de/e/anwendung/anwend_grp.htm?grp=Wood.

(Continued)

*Primary Examiner* — Clark F. Dexter
(74) *Attorney, Agent, or Firm* — K&L Gates LLP

(57) ABSTRACT

An optical system mounted on a cutter that has a base and a housing supporting a blade. In one embodiment, the optical system may project first and second indicator lines on the base. The optical system may also include a mechanism selectively operable to adjust the first and second lines to indicate the width of the blade.

20 Claims, 16 Drawing Sheets

U.S. PATENT DOCUMENTS

| | | | |
|---|---|---|---|
| 2,313,686 A | 3/1943 | Uremovich | |
| 2,357,194 A | 8/1944 | Hazelton et al. | |
| 2,407,845 A | 9/1946 | Nemeyer | |
| 2,465,000 A | 3/1949 | Turner | |
| 2,488,947 A | 11/1949 | Vavrik | |
| 2,518,684 A | 8/1950 | Harris | |
| 2,557,029 A | 6/1951 | Griffin | |
| 2,623,555 A | 12/1952 | Eschenburg | |
| 2,806,492 A | 9/1957 | Becker | |
| 2,850,054 A | 9/1958 | Eschenburg | |
| 2,855,679 A | 10/1958 | Gibble | |
| 3,005,477 A | 10/1961 | Sherwen | |
| 3,011,529 A | 12/1961 | Copp | |
| 3,013,592 A | 12/1961 | Ambrosio et al. | |
| 3,124,178 A | 3/1964 | Packard | |
| 3,130,621 A | 4/1964 | Else | |
| 3,179,458 A | 4/1965 | Sconzo | |
| 3,344,819 A | 10/1967 | Mitchell | |
| 3,496,814 A | 2/1970 | Bessim | |
| 3,540,338 A | 11/1970 | McEwan et al. | |
| 3,572,937 A | 3/1971 | Baldwin | |
| 3,597,091 A | 8/1971 | Bowker | |
| 3,635,108 A | 1/1972 | Prince | |
| 3,713,746 A | 1/1973 | Luthy | |
| 3,728,027 A | 4/1973 | Watanabe | |
| 3,780,777 A | 12/1973 | Davies | |
| 3,837,757 A | 9/1974 | Levine | |
| 3,854,836 A | 12/1974 | Weissman | |
| 3,891,039 A | 6/1975 | Lagerstrom | |
| 3,970,359 A | 7/1976 | Starkweather | |
| 3,972,582 A | 8/1976 | Oosaka et al. | |
| 3,976,384 A | 8/1976 | Matthews et al. | |
| 4,046,985 A | 9/1977 | Gates | |
| 4,078,869 A * | 3/1978 | Honeycutt | 408/16 |
| 4,184,394 A | 1/1980 | Gjerde | |
| 4,255,056 A | 3/1981 | Peterson | |
| 4,257,297 A | 3/1981 | Nidbella | |
| 4,319,403 A | 3/1982 | Stearns | |
| 4,338,723 A | 7/1982 | Benjamin | |
| 4,383,373 A | 5/1983 | Couturier | |
| 4,386,532 A | 6/1983 | Benjamin | |
| 4,413,662 A | 11/1983 | Gregoire et al. | |
| 4,438,567 A | 3/1984 | Raiha | |
| 4,447,956 A | 5/1984 | Chung | |
| 4,450,627 A | 5/1984 | Morimoto | |
| 4,468,992 A | 9/1984 | McGeehee | |
| 4,469,318 A | 9/1984 | Slavic | |
| 4,469,931 A | 9/1984 | Macken | |
| 4,503,740 A | 3/1985 | Brand et al. | |
| 4,534,093 A | 8/1985 | Jahnke et al. | |
| 4,566,202 A | 1/1986 | Hamar | |
| 4,581,808 A | 4/1986 | Lawson et al. | |
| 4,589,208 A | 5/1986 | Iwasaki et al. | |
| 4,598,481 A | 7/1986 | Donahue | |
| 4,607,555 A | 8/1986 | Erhard | |
| 4,651,732 A | 3/1987 | Frederick | |
| 4,676,130 A | 6/1987 | Nutt | |
| 4,723,911 A | 2/1988 | Kurtz | |
| 4,725,933 A | 2/1988 | Houk | |
| 4,775,205 A | 10/1988 | Muramatsu | |
| 4,803,976 A | 2/1989 | Frigg et al. | |
| 4,805,500 A | 2/1989 | Saito et al. | |
| 4,805,504 A | 2/1989 | Fushiya et al. | |
| 4,817,839 A | 4/1989 | Weissman | |
| 4,820,911 A | 4/1989 | Arackellian et al. | |
| 4,833,782 A | 5/1989 | Smith | |
| 4,836,671 A | 6/1989 | Bautista | |
| 4,885,965 A | 12/1989 | Weissman | |
| 4,885,967 A | 12/1989 | Bell et al. | |
| 4,887,193 A | 12/1989 | Dieckmann | |
| D305,542 S | 1/1990 | Miyamoto et al. | |
| 4,934,233 A | 6/1990 | Brundage et al. | |
| 4,945,797 A | 8/1990 | Hahn | |
| 4,964,449 A | 10/1990 | Conners | |
| 4,976,019 A | 12/1990 | Kitamura | |
| 4,978,246 A | 12/1990 | Quenzi et al. | |
| 5,013,317 A | 5/1991 | Cole et al. | |
| 5,031,203 A | 7/1991 | Trecha | |
| 5,038,481 A | 8/1991 | Smith | |
| 5,052,112 A | 10/1991 | MacDonald | |
| 5,148,232 A | 9/1992 | Duey et al. | |
| 5,159,864 A | 11/1992 | Wedemeyer et al. | |
| 5,159,869 A | 11/1992 | Tagliaferri | |
| 5,161,922 A | 11/1992 | Malloy | |
| 5,199,343 A | 4/1993 | O'Banion | |
| 5,203,245 A | 4/1993 | Terpstra | |
| 5,203,650 A | 4/1993 | McCourtney | |
| 5,207,007 A | 5/1993 | Cucinotta et al. | |
| 5,212,720 A | 5/1993 | Landi et al. | |
| 5,267,129 A | 11/1993 | Anderson | |
| 5,283,808 A | 2/1994 | Cramer et al. | |
| 5,285,708 A | 2/1994 | Bosten et al. | |
| D346,173 S | 4/1994 | Price | |
| 5,316,014 A | 5/1994 | Livingston | |
| 5,320,111 A | 6/1994 | Livingston | |
| 5,357,834 A | 10/1994 | Ito et al. | |
| 5,365,822 A | 11/1994 | Stapleton et al. | |
| 5,375,495 A | 12/1994 | Bosten et al. | |
| 5,387,969 A | 2/1995 | Marantette | |
| 5,426,687 A | 6/1995 | Goodall et al. | |
| 5,439,328 A | 8/1995 | Haggerty et al. | |
| 5,446,635 A | 8/1995 | Jehn | |
| 5,461,790 A | 10/1995 | Olstowski | |
| 5,481,466 A | 1/1996 | Carey | |
| 5,488,781 A | 2/1996 | Van Der Horst | |
| 5,495,784 A | 3/1996 | Chen | |
| 5,509,337 A | 4/1996 | Norman et al. | |
| 5,522,683 A | 6/1996 | Kakimoto et al. | |
| 5,529,441 A | 6/1996 | Kosmowski et al. | |
| D372,484 S | 8/1996 | Price et al. | |
| 5,546,840 A | 8/1996 | Supe-Dienes | |
| 5,579,102 A | 11/1996 | Pratt et al. | |
| 5,593,606 A | 1/1997 | Owen et al. | |
| 5,644,616 A | 7/1997 | Landi et al. | |
| 5,661,775 A | 8/1997 | Cramer et al. | |
| D383,765 S | 9/1997 | Kani et al. | |
| 5,662,017 A | 9/1997 | Mellon | |
| 5,667,345 A | 9/1997 | Wiklund | |
| 5,675,899 A | 10/1997 | Webb | |
| D388,442 S | 12/1997 | Shibata et al. | |
| 5,720,213 A | 2/1998 | Sberveglieri | |
| D391,973 S | 3/1998 | Price et al. | |
| 5,724,875 A | 3/1998 | Meredith et al. | |
| 5,741,096 A | 4/1998 | Olds | |
| 5,777,562 A | 7/1998 | Hoffman | |
| 5,782,842 A | 7/1998 | Kloess et al. | |
| 5,784,792 A | 7/1998 | Smith | |
| 5,797,670 A | 8/1998 | Snoke et al. | |
| D400,215 S | 10/1998 | Price et al. | |
| 5,819,625 A | 10/1998 | Sberveglieri | |
| 5,835,517 A | 11/1998 | Jayaraman et al. | |
| 5,835,519 A | 11/1998 | Tsukamoto et al. | |
| 5,862,727 A | 1/1999 | Kelly | |
| 5,911,482 A | 6/1999 | Campbell et al. | |
| 5,918,523 A | 7/1999 | Cutter | |
| 5,943,931 A | 8/1999 | Stumpf et al. | |
| 5,943,932 A | 8/1999 | Sberveglieri | |
| 5,949,810 A | 9/1999 | Star et al. | |
| 5,957,021 A | 9/1999 | Meredith et al. | |
| 5,967,645 A | 10/1999 | Anderson | |
| 5,968,383 A | 10/1999 | Yamazaki et al. | |
| 5,979,523 A | 11/1999 | Puzio et al. | |
| 5,995,230 A | 11/1999 | Madlener et al. | |
| 5,996,460 A | 12/1999 | Waite | |
| D420,370 S | 2/2000 | Shibata et al. | |
| D421,267 S | 2/2000 | Price et al. | |
| 6,023,071 A | 2/2000 | Ogura et al. | |
| 6,035,757 A | 3/2000 | Caluori et al. | |
| D423,526 S | 4/2000 | Brazell et al. | |
| D425,083 S | 5/2000 | Brickner, Jr. et al. | |
| 6,055,734 A | 5/2000 | McCurry et al. | |
| 6,076,445 A | 6/2000 | Kenyon et al. | |
| D428,426 S | 7/2000 | Brazell | |
| 6,137,577 A | 10/2000 | Woodworth | |
| 6,152,372 A | 11/2000 | Colley et al. | |
| 6,170,370 B1 | 1/2001 | Sommerville | |
| 6,182,548 B1 | 2/2001 | Meredith et al. | |

| | | |
|---|---|---|
| 6,209,597 B1 | 4/2001 | Calcote |
| D441,771 S | 5/2001 | Bean et al. |
| 6,223,794 B1 | 5/2001 | Jones |
| 6,237,230 B1 | 5/2001 | Campbell et al. |
| 6,239,913 B1 | 5/2001 | Tanaka |
| 6,263,584 B1 | 7/2001 | Owens |
| 6,283,002 B1 | 9/2001 | Chiang |
| 6,301,997 B1 | 10/2001 | Welte |
| 6,328,505 B1 | 12/2001 | Gibble |
| 6,375,395 B1 | 4/2002 | Heintzeman |
| 6,397,717 B1 | 6/2002 | Waite |
| 6,403,920 B1 | 6/2002 | Muneyuki et al. |
| 6,413,022 B1 | 7/2002 | Sarh |
| 6,419,426 B1 | 7/2002 | Chalupa et al. |
| 6,460,768 B2 | 10/2002 | Ring et al. |
| D465,165 S | 11/2002 | Doyle et al. |
| 6,481,322 B1 * | 11/2002 | Hsiung ............... 83/521 |
| 6,493,955 B1 | 12/2002 | Moretti |
| 6,494,590 B1 | 12/2002 | Paganini et al. |
| 6,530,303 B1 | 3/2003 | Parks et al. |
| 6,536,536 B1 | 3/2003 | Gass et al. |
| 6,546,835 B2 | 4/2003 | Wang |
| 6,550,118 B2 | 4/2003 | Smith et al. |
| 6,565,227 B1 | 5/2003 | Davis |
| 6,578,459 B2 | 6/2003 | Waite |
| 6,584,695 B1 | 7/2003 | Chang |
| 6,587,184 B2 | 7/2003 | Wursch et al. |
| 6,593,587 B2 | 7/2003 | Pease |
| 6,621,565 B2 | 9/2003 | Pratt et al. |
| 6,644,156 B2 | 11/2003 | Villacis |
| 6,647,868 B2 | 11/2003 | Chen |
| 6,662,457 B2 | 12/2003 | Dameron |
| 6,684,750 B2 | 2/2004 | Yu |
| 6,688,203 B2 | 2/2004 | Chen |
| 6,736,042 B2 | 5/2004 | Behne et al. |
| 6,736,044 B2 | 5/2004 | Chang |
| 6,739,042 B2 | 5/2004 | Thorum |
| 6,742,430 B2 | 6/2004 | Chen |
| 6,755,107 B2 | 6/2004 | Peot et al. |
| 6,757,984 B2 | 7/2004 | Harris |
| 6,763,597 B2 | 7/2004 | Lysen |
| 6,890,135 B2 * | 5/2005 | Kopras et al. ............... 409/182 |
| 6,976,764 B2 | 12/2005 | Cheng et al. |
| 7,369,916 B2 * | 5/2008 | Etter et al. ............... 700/160 |
| 2001/0028025 A1 | 10/2001 | Pease |
| 2001/0029819 A1 | 10/2001 | Okouchi |
| 2001/0034951 A1 | 11/2001 | Sears |
| 2001/0049988 A1 | 12/2001 | Ushiwata et al. |
| 2002/0000148 A1 | 1/2002 | Brun |
| 2002/0054491 A1 | 5/2002 | Casas |
| 2002/0059871 A1 | 5/2002 | Chen |
| 2002/0131267 A1 | 9/2002 | Van Osenbruggen |
| 2002/0146295 A1 | 10/2002 | Schaer et al. |
| 2002/0164217 A1 | 11/2002 | Peterson |
| 2002/0170404 A1 | 11/2002 | Peot et al. |
| 2002/0172035 A1 * | 11/2002 | Hara et al. ............... 362/119 |
| 2002/0197123 A1 * | 12/2002 | Kopras et al. ............... 409/182 |
| 2003/0000355 A1 | 1/2003 | Butler et al. |
| 2003/0010173 A1 | 1/2003 | Hayden |
| 2003/0027353 A1 | 2/2003 | Bright et al. |
| 2003/0029050 A1 | 2/2003 | Fung et al. |
| 2003/0042803 A1 * | 3/2003 | Hirschburger et al. ......... 310/47 |
| 2003/0101857 A1 | 6/2003 | Chuang |
| 2003/0150312 A1 | 8/2003 | Chang |
| 2003/0197138 A1 | 10/2003 | Pease et al. |
| 2003/0200851 A1 | 10/2003 | Yu |
| 2003/0209678 A1 | 11/2003 | Pease |
| 2003/0233921 A1 | 12/2003 | Garcia et al. |
| 2004/0032587 A1 | 2/2004 | Garcia et al. |
| 2005/0011327 A1 * | 1/2005 | Ushiwata et al. ............... 83/521 |
| 2006/0101969 A1 | 5/2006 | Garcia et al. |

FOREIGN PATENT DOCUMENTS

| | | |
|---|---|---|
| DE | 3500371 A1 | 7/1986 |
| DE | 10119061 A1 | 11/2001 |
| EP | 0 504 745 A1 | 9/1992 |
| GB | 599718 | 3/1948 |
| GB | 674894 | 7/1952 |
| GB | 782280 | 9/1957 |
| GB | 1016387 | 1/1966 |
| JP | 8197381 | 8/1996 |
| JP | 2001347501 | 12/2001 |

OTHER PUBLICATIONS

Double Insulated Miter Saw with LaserLoc, Line-of-Cut Indicator, Instruction Manual, Porter Cable.

BladePoint Laser Guide, Bladepoint™ Laser Guide Accurate Cutting Just Got Easier, http://www.bladepoint.com.

DeWALT model DW706, photographs, date unknown.

Sears Craftsman model 315.243150, photographs, date unknown.

Product Picks from the National Hardware Show, Fall Homes 1992, Sep. 23, 1992.

Building Trades and Home Shop Machinery, Delta, Jan. 1993, see generally pp. 5-25.

Garcia at al., U.S. Appl. No. 10/632,561, filed Jul. 31, 2003.

Patent Abstracts of Japan, Publication No. 11-170203, application published Jun. 29, 1999.

Patent Abstracts of Japan, Publication No. 2000-225602, application published Aug. 15, 2000.

Patent Abstracts of Japan, Publication No. 2000-225603, application published Aug. 15, 2000.

Patent Abstracts of Japan, Publication No. 2001-150401, application published Jun. 5, 2001.

Patent Abstracts of Japan, Publication No. 2001-158003, application published Jun. 12, 2001.

Patent Abstracts of Japan, Publication No. 2000-317901, application published Nov. 21, 2000.

Patent Abstracts of Japan, Publication No. 2001-300818, application published Oct. 30, 2001.

Patent Abstracts of Japan, Publication No. 2001-300902, application published Oct. 30, 2001.

Abstract, Japanese Patent No. 8197381.

Abstract, German Laid-Open No. DE 3104340 A1, dated Feb. 25, 1982.

Abstract, German Laid-Open No. DE 3500371 A1, dated Jan. 8, 1985.

Abstract, German Laid-Open No. DE 101 19 061 A1, dated Nov. 15, 2001.

* cited by examiner

120 # CUTTER WITH OPTICAL ALIGNMENT SYSTEM

CROSS-REFERENCE TO RELATED APPLICATIONS

This application is a continuation of U.S. patent application Ser. No. 10/174,731 filed Jun. 19, 2002 now abandoned.

BACKGROUND OF THE INVENTION

Recent patents, such as U.S. Pat. Nos. 5,285,708 and 5,375,495, disclose optical alignment systems for power saws that have circular blades. Such optical alignment systems typically utilize a single laser generator that projects a line on a workpiece to indicate the location at which one of the sides of the blade will enter the workpiece and purport to facilitate cutting the workpiece.

Because power saw blades have varying thicknesses, there is a need for an optical system that may be used to indicate accurately the width of the material to be removed by the blade in a cost-efficient and convenient manner.

SUMMARY OF THE INVENTION

One embodiment of the invention provides an optical system mounted on a cutter that has a base and a housing supporting a blade. The optical system may projects first and second indicator lines on the base. The optical system may also include a mechanism selectively operable to adjust the first and second lines to indicate the width of the blade.

BRIEF DESCRIPTION OF THE DRAWINGS

In the accompanying Figures, there are shown present embodiments of the invention wherein like reference numerals are employed to designate like parts and wherein:

FIG. 3b is a top view of the optical system of FIG. 3a;

FIG. 4a is a cross-sectional view of an embodiment of a laser generator holder for the optical system of FIG. 3a;

FIG. 4b is an exploded view of FIG. 4a;

FIG. 5 is a right side perspective view of the optical system of FIG. 3a;

FIG. 9 is a right side perspective view of an embodiment of a cover for the optical system of FIG. 3a;

FIGS. 12a-12d are plan views of a portion of the cutter base for the cutter of FIG. 1 diagrammatically showing various adjustments of the indicator lines of the optical system of FIG. 3a;

FIG. 14 is a perspective view of an embodiment of a laser generator for the optical system of FIG. 3a.

DETAILED DESCRIPTION OF THE INVENTION

Figure 1:
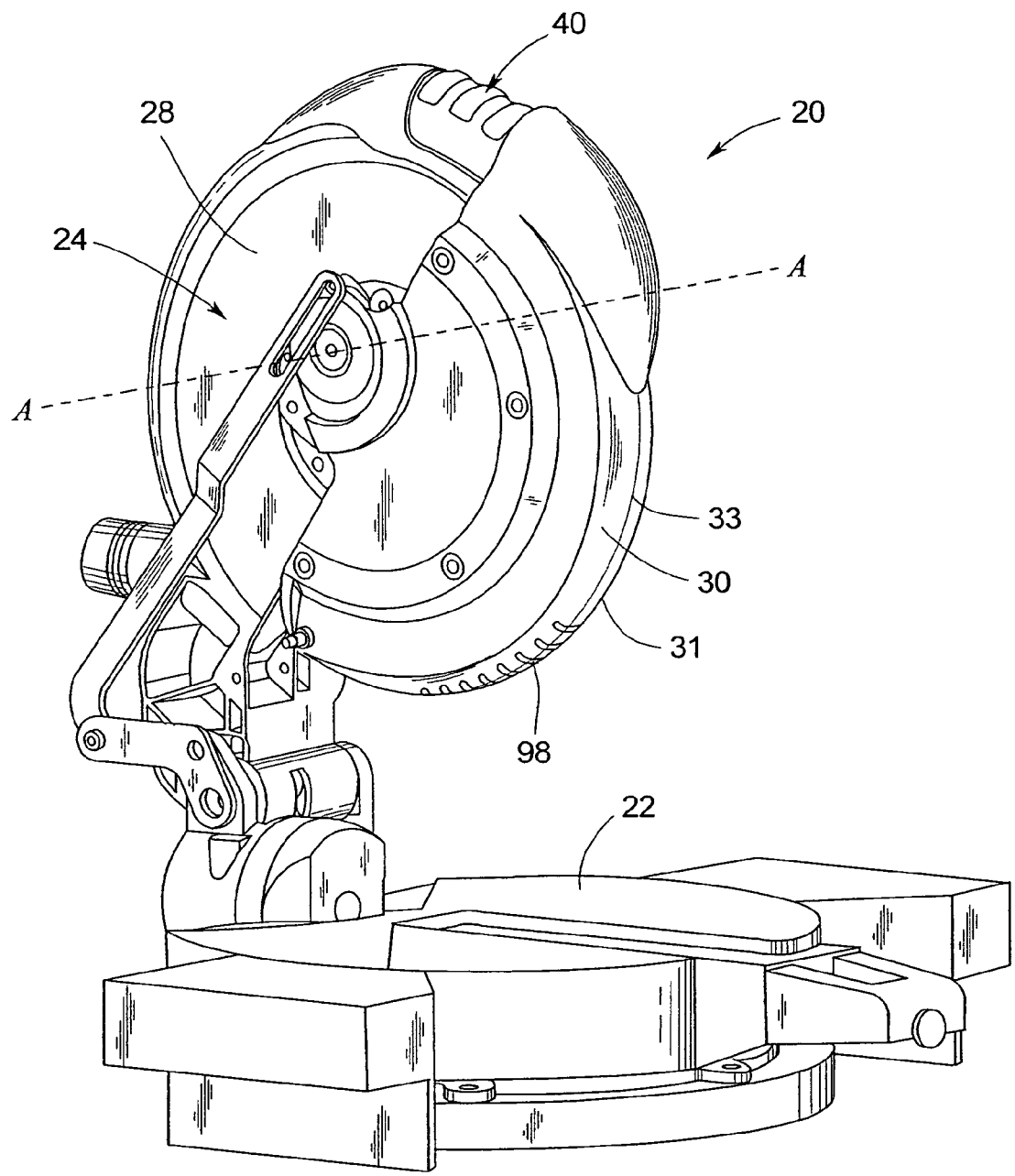
FIG. 1 is a perspective view of an embodiment of the cutter according to the invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. Furthermore, it will be appreciated that the characterizations of various components and orientations described herein as being "vertical" or "horizontal", "right" or "left", "side", "upper" or "lower", are relative characterizations only based upon the particular position or orientation of a given component for a particular application.

Figure 2:
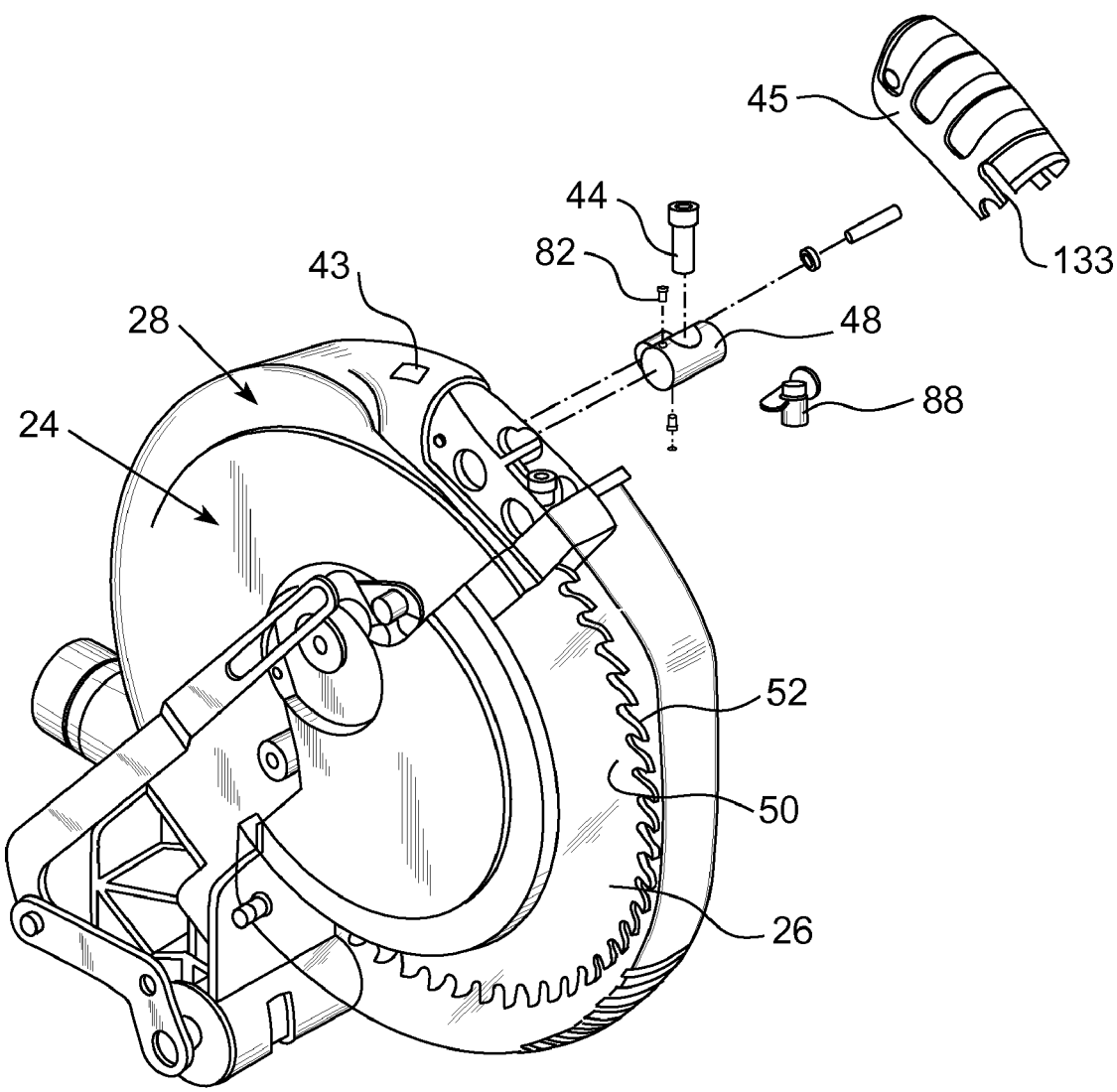
FIG. 2 is a partially exploded view of a portion of the cutter of FIG. 1.

FIGS. 1 and 2 are partial perspective views of an embodiment of a cutter 20 having a base 22 and a housing 24. The housing 24 supports a blade 26 that is rotatable about an axis A-A by a conventional electric motor (not shown), and may include an upper blade guard 28 and movable lower blade guard 30. The blade 26 has two lateral sides 50, 52, which define the width of the cut made by the blade 26. See FIG. 2. Accordingly, if the blade 26 has carbide tooth inserts, as is common in some applications, the outermost surfaces of such inserts define the width of the cut and comprise the lateral sides 50, 52 of the blade 26. The cutter 20 may be any circular saw, such as, for example, a miter saw, a table saw, a radial arm saw, a cutoff saw, a hand-held circular saw, a frame and trim saw, a compound and slide miter saw, etc., although other non-circular cutters may also be used. The manufacture and operation of such saws are known in the art and, therefore, they will not be described herein beyond what is necessary for a person of ordinary skill in the art to make and use the various embodiments of the subject invention.

An embodiment of an optical alignment system 40 for the cutter 20 may be mounted on the upper guard 28. See FIGS. 2-9. In one embodiment, the optical alignment system 40 may include first and second laser generators 42, 44 mounted on respective first and second holders 46, 48. Each of the holders 46, 48 may have a cylindrical portion 41, 47, with a respective axis $A_1$-$A_1$, $A_2$-$A_2$, which is parallel to the axis A-A of the blade 26 when the holder 46, 48 is installed on the upper guard 28. The holders 46, 48 may also include lateral adjustment portions 51, 57 and may be slidably supported on the upper blade guard 28 such that they can be laterally displaced relative to the blade 26 along their respective axes $A_1$-$A_1$, $A_2$-$A_2$ in the lateral directions represented by arrows "D" and "E".

In one embodiment, the right and left walls 21, 23 of the upper guard 28 may include various openings that have surface portions that slidably support the holders 46, 48. The openings may also facilitate the installation of the holders 46, 48 on the upper guard 28. For example, the left wall 23 may include circular left side openings 120 having bearing surfaces 121 that are in contact with the left ends 122 of the cylindrical portions 41, 47 of the holders 46, 48. See FIG. 7. The right wall 21 may include right side openings 124 that are sized and shaped to receive the holders 46, 48. The openings 124 may also include bearing surfaces 123 that are in bearing contact with the right ends 126 of cylindrical portions 41, 47 of the holders 46, 48.

After the holders 46, 48 are inserted through the right side openings 124 into the upper guard 28 between the right and left walls 21, 23, they may be rotated into operative positions in the direction of the arrows "F" and "G". The operative positions may be determined such that, for example, the laser generators 42, 44 project light that passes through openings 98 of the lower guard 30 of the cutter 20 when the blade 26 is in its uppermost position away from the base 22. See FIG. 1. The holders 46, 48 may be rotated in the direction opposite to the directions represented by the arrows F and G for removal from the upper blade guard 28. It will be appreciated that the laser generators 42, 44 may first be removed from the holders 46, 48 during the installation or removal of the holders 46, 48 into and out of the upper blade guard 28.

Figure 3A:
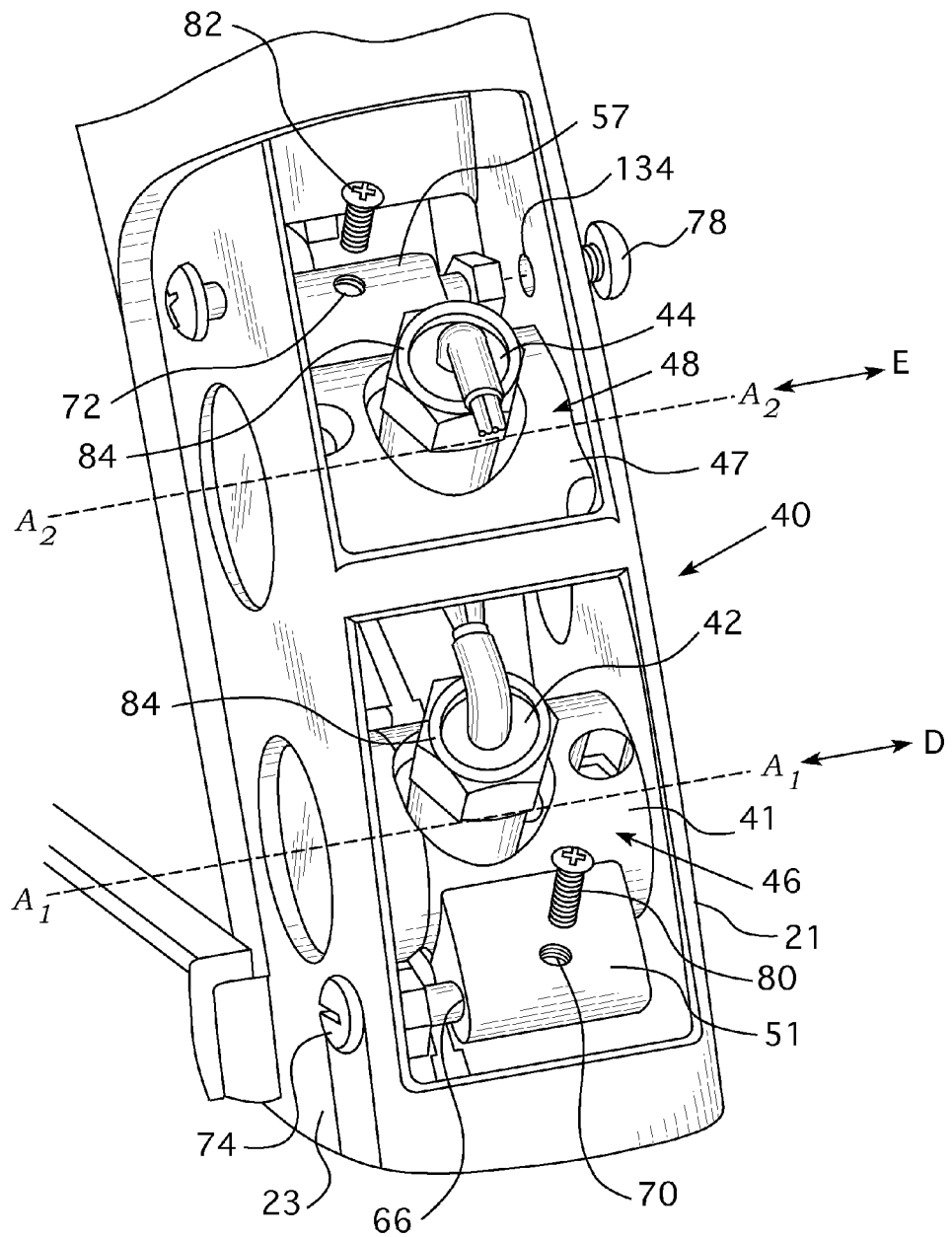
FIG. 3a is a left side perspective view of an embodiment of an optical system employed in the cutter embodiment of FIG. 1.
Figure 3B:
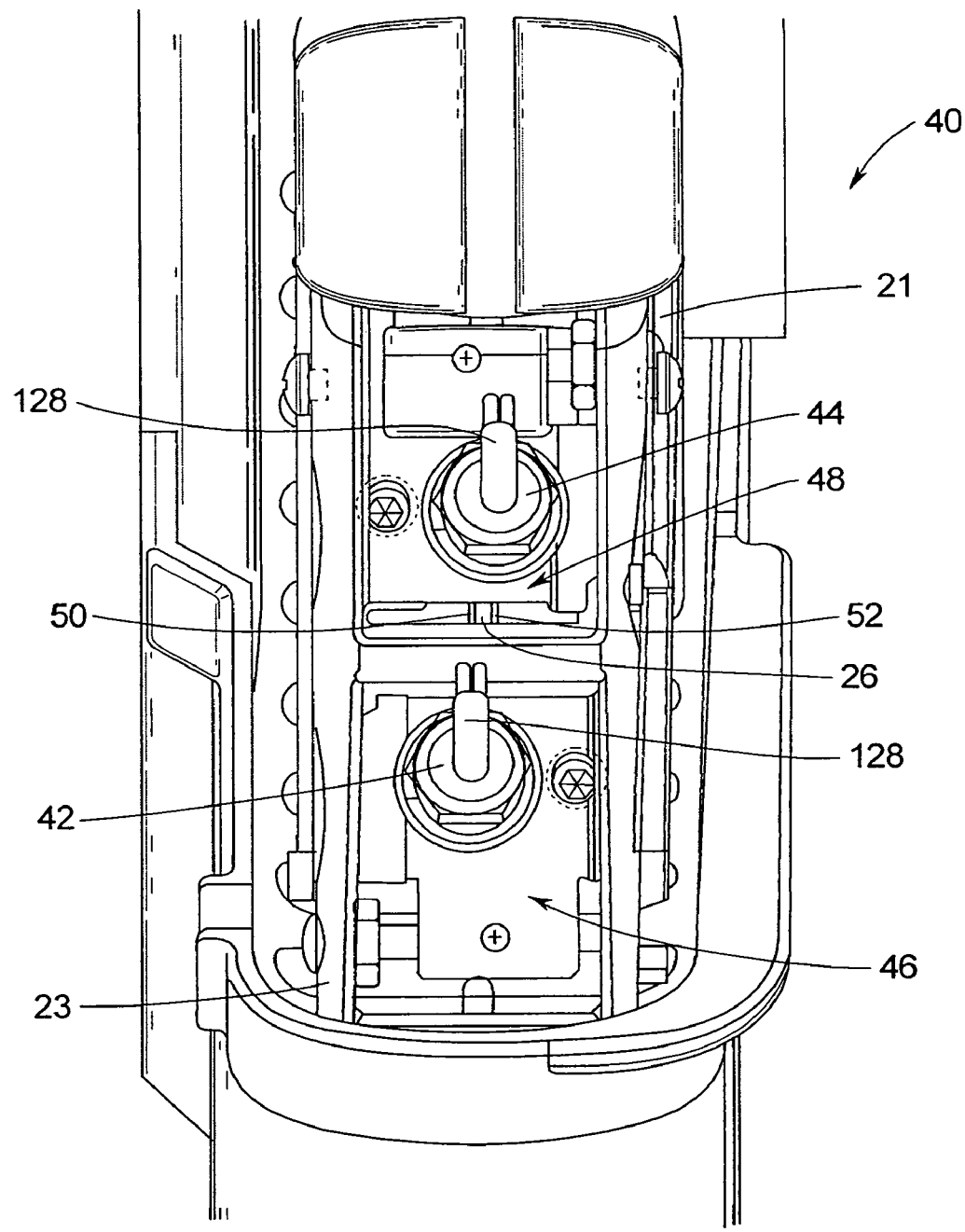

More particularly and with reference to FIG. 3a, the first and second laser generators 42, 44 may be mounted on the respective holders 46, 48 so that they are laterally offset from the blade 26 and on opposite lateral sides 50, 52 of the blade 26. The laser generators 42, 44 may be powered by a battery or a cutter power source via electrical cables 128. In the latter case, converters may be connected to the laser generators 42, 44 to convert the alternate current of the cutter power source to direct current for the laser generators 42, 44, and to reduce the power source voltage level to the voltage level of the laser generators 42, 44. In one embodiment, the laser generators 42, 44 may be controlled through a dedicated switch 43, which may be located, for example, on the upper blade guard 28. See FIG. 2. The power to the laser generators 42, 44, may be also controlled by the electric switch of the cutter 20 in certain applications, such that the laser generators 42, 44 are powered when the cutter 20 is powered.

Figure 14:
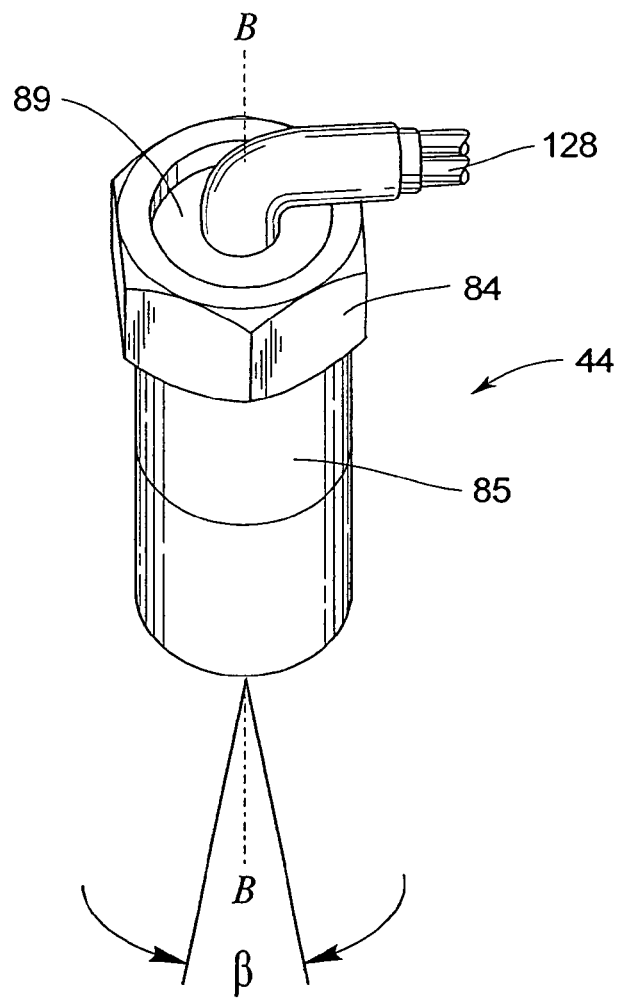

The laser generators 42, 44 may comprise commercial laser generators of the type that produce a fan of light, i.e. line generators, such as those laser line generators manufactured by Sean & Stephen Corporation of Taiwan and China under Model 1894. In one embodiment, each laser generator 42, 44 may be customized to include a handle arrangement 84, such as, for example, a nut or socket attached to a barrel 85 that encloses the laser unit 89 of the laser generator 42, 44. See FIG. 14.

To prevent accidental rotation of the laser generators 42, 44 within the holders 46, 48 respectively, frictional inserts 86 may be supported in the holders 46, 48 to frictionally contact the lateral surfaces of the laser generators 42, 44. The frictional inserts 86 may be made of foam, rubber or other material that may increase the coefficient of friction at the lateral surfaces of the laser generators 42, 44. See FIGS. 4a and 4b.

Additionally, the optical lens of the laser unit 89 may be customized so that it produces a fan angle "B" of approximately 30° centrally disposed about axis B-B, instead of the 60° fan angle B of typical commercial laser line generators. See FIG. 14. The narrower fan angle produces a laser beam of greater intensity that may be visible even in direct sunlight.

In one embodiment, the optical alignment system 40 may also be protected by a removable cover 45 that is attached to the upper blade guard 28 by fasteners 131, such as, for example, screws, or by other fastening arrangements or snap-on fittings, etc. See FIGS. 2 and 9. The cover 45 may also include openings 133 that provide access to lateral adjustment features for the holders 46, 48, as will be described below. The cover 45 may be molded as one piece from polymeric material or otherwise manufactured as is known in the art.

Figure 10:
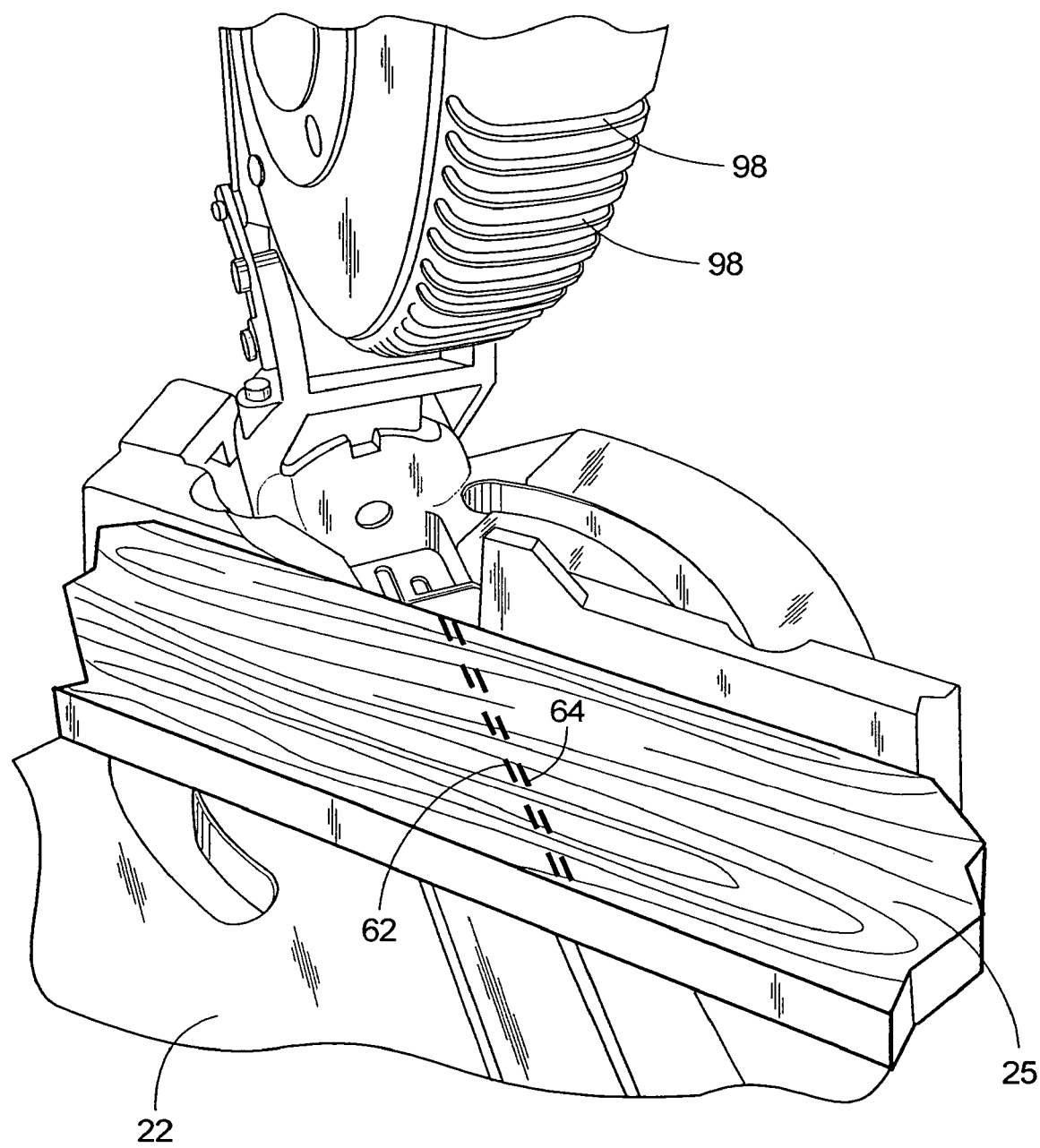
FIG. 10 is a partial perspective view of the cutter of FIG. 1 showing two indicator lines projected by the optical system of FIG. 3a in one configuration on a workpiece prior to cutting.

In one embodiment, when the laser generators 42, 44 are powered, they project two indicator lines 62, 64 on the base 22 or on a workpiece 25 that is supported on the base 22. See FIG. 10. Namely, the first laser generator 42 projects a "left" indicator line 62 and the second laser generator 44 projects a "right" indicator line 64. The optical alignment system 40 may also include several adjustment mechanisms that can be used to adjust the spacing, position and orientation of the indicator lines 62, 64 relative to each other and relative to the blade 26, to indicate the width of the workpiece material or "kerf" 100 to be removed by the blade 26.

Figure 11:
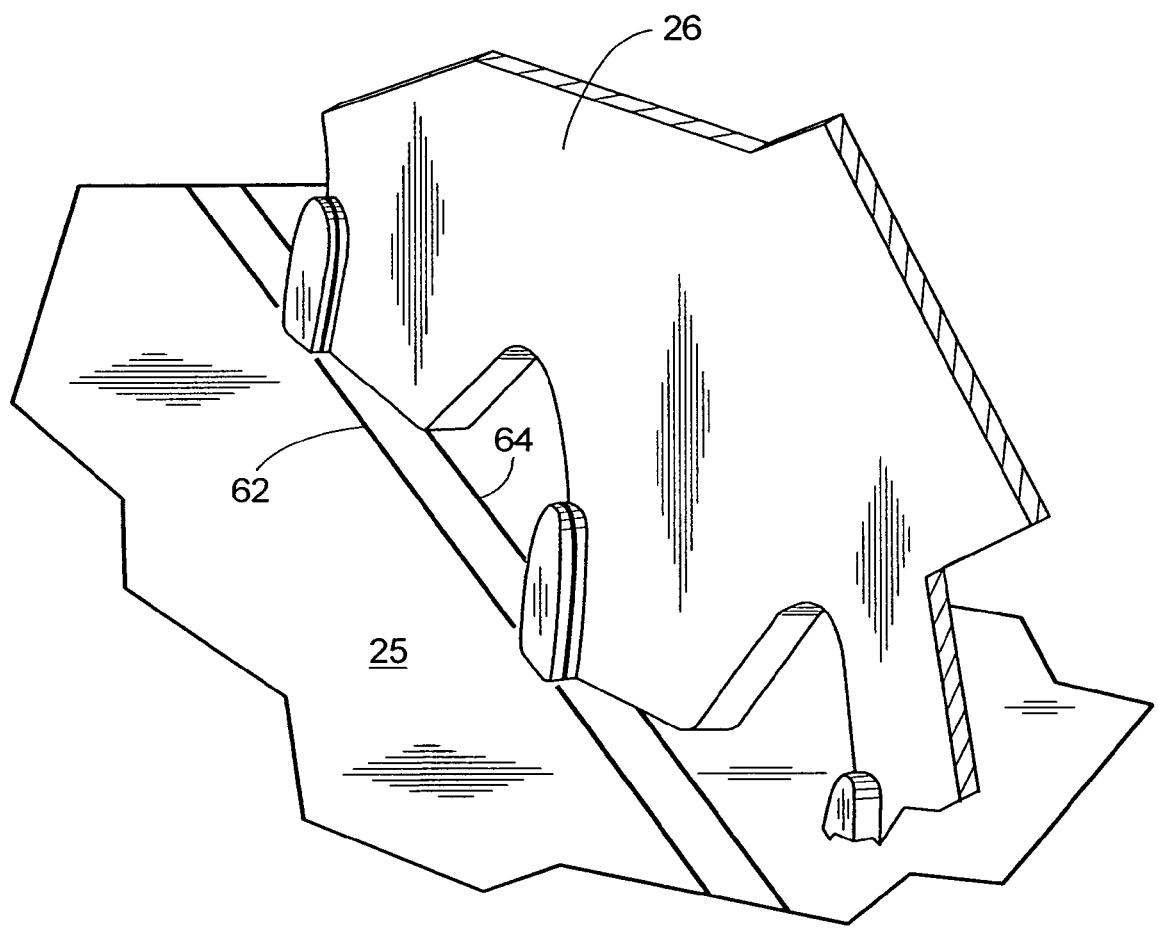
FIG. 11 is an enlarged partial perspective view of the blade of the cutter of FIG. 1 showing two indicator lines projected by the optical system of FIG. 3a in another configuration on a workpiece prior to cutting.
Figure 12A:
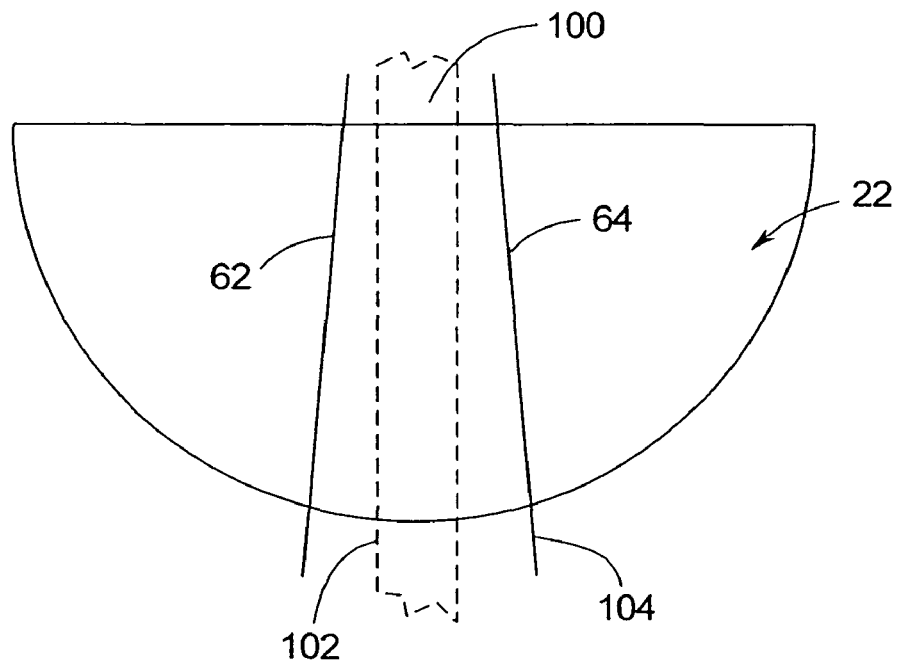

FIGS. 12a-12d illustrate a portion of the base 22 and also show the indicator lines 62, 64. Although the workpiece 25 and the blade 26 are not shown in these Figures, the kerf 100 is depicted in dashed lines to illustrate the various adjustments of the indicator lines relative to the kerf 100. FIG. 12a illustrates the left indicator line 62 and the right indicator line 64 in a non-parallel relationship. A parallelism adjustment may be provided by rotating each laser generator 42, 44 about its own longitudinal axis B-B to cause the respective indicator line 62, 64 to become parallel to a respective lateral side of the blade 26, defining the kerf 100. See FIGS. 11, 12a and 12B. The handle 84 attached to each laser generator 42, 44 may be used to facilitate the rotation of the laser generators 42, 44 about their longitudinal axes B-B.

Figure 4A:
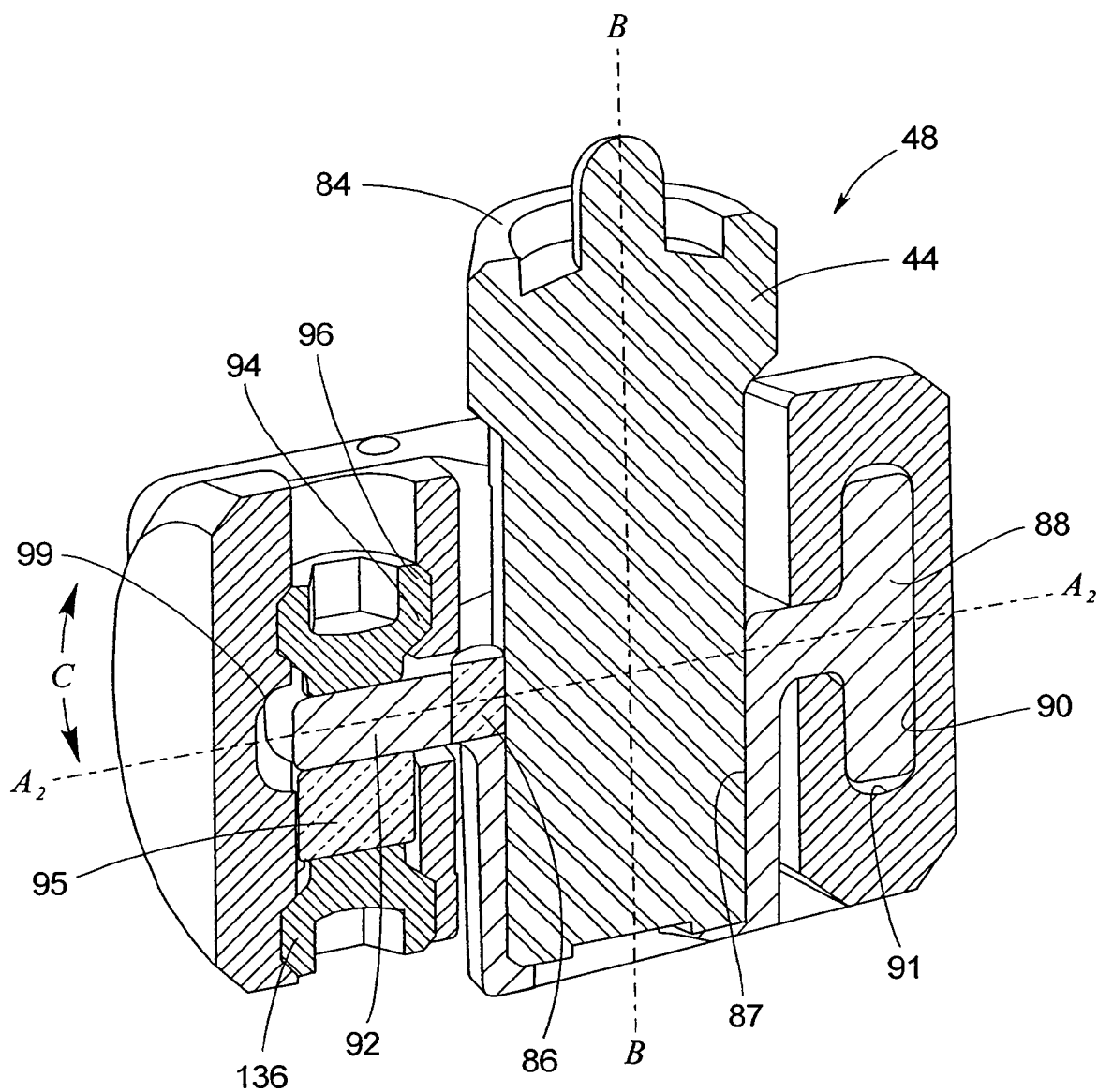
Figure 4B:
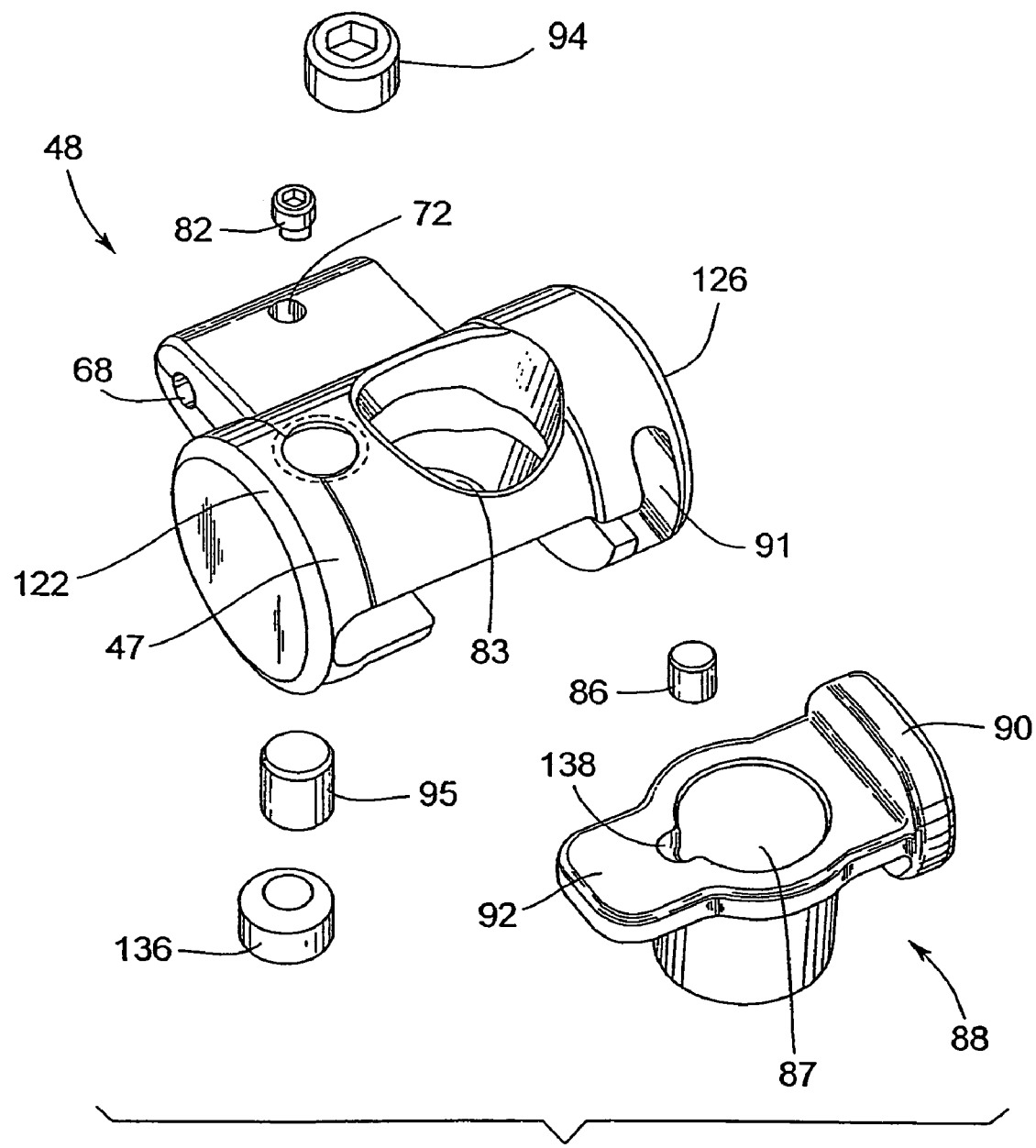
Figure 5:
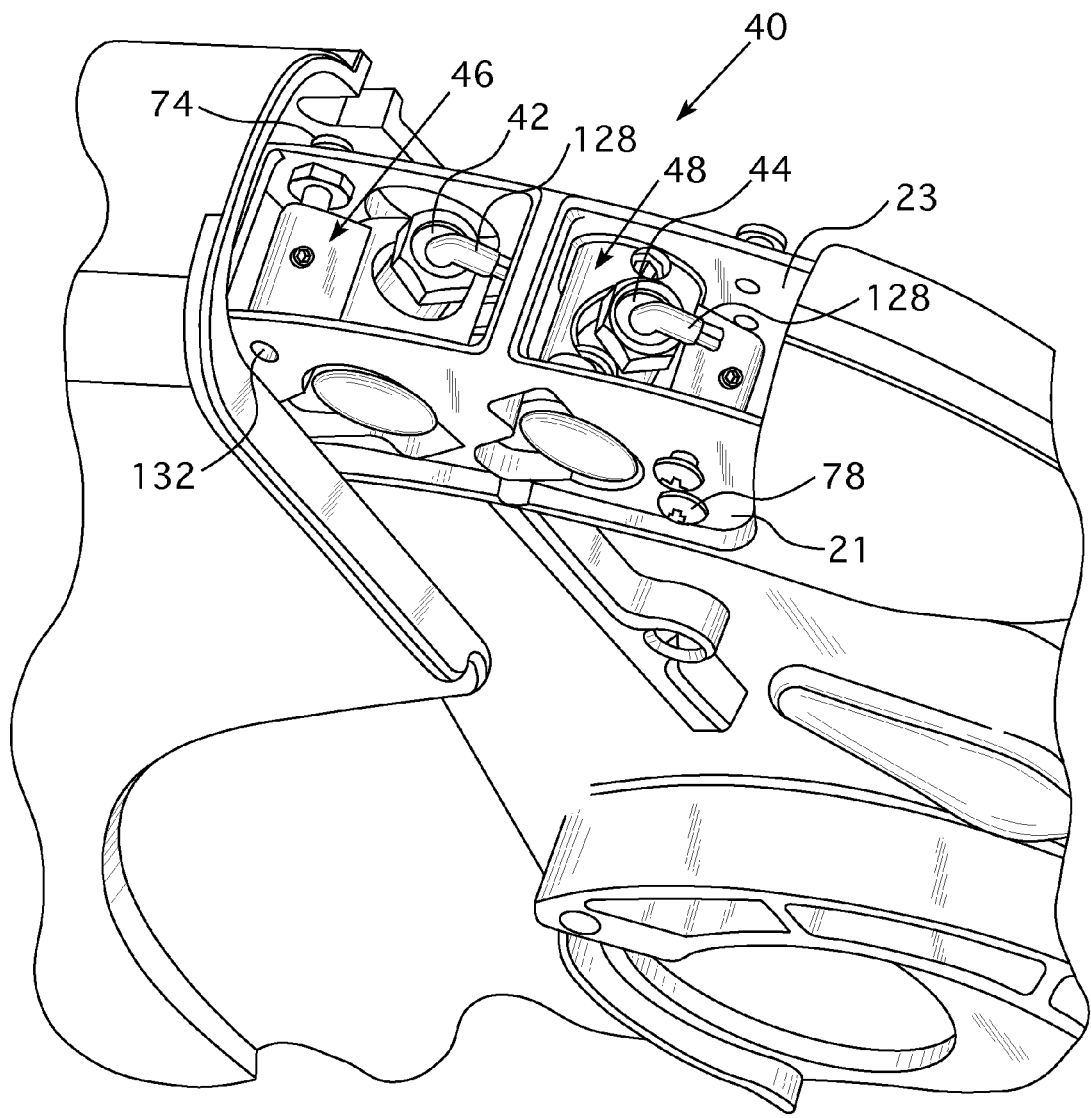
Figure 6:
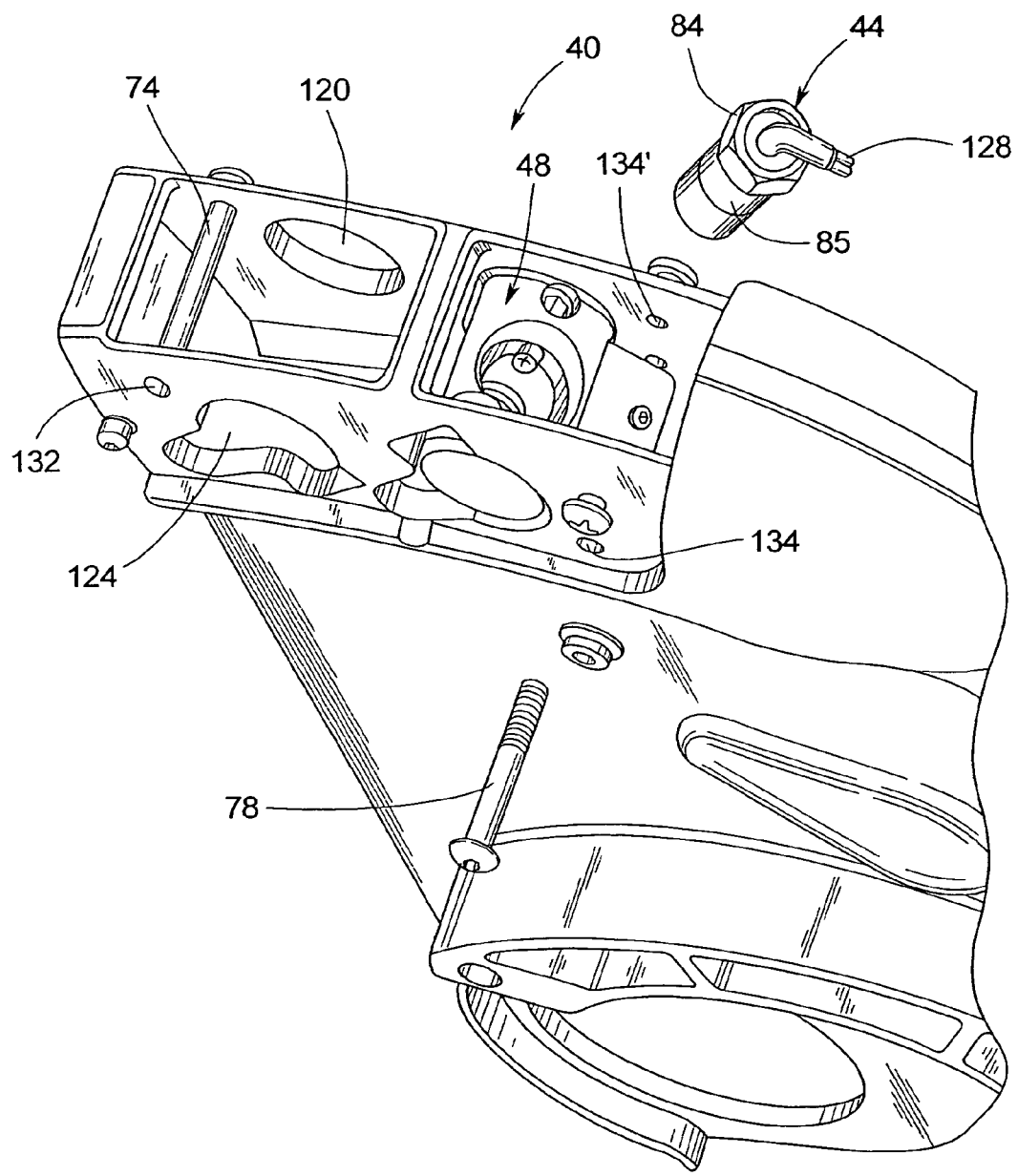
FIG. 6 is a right side perspective and partially exploded view of the optical system of FIG. 3a with one laser generator holder removed.
Figure 7:
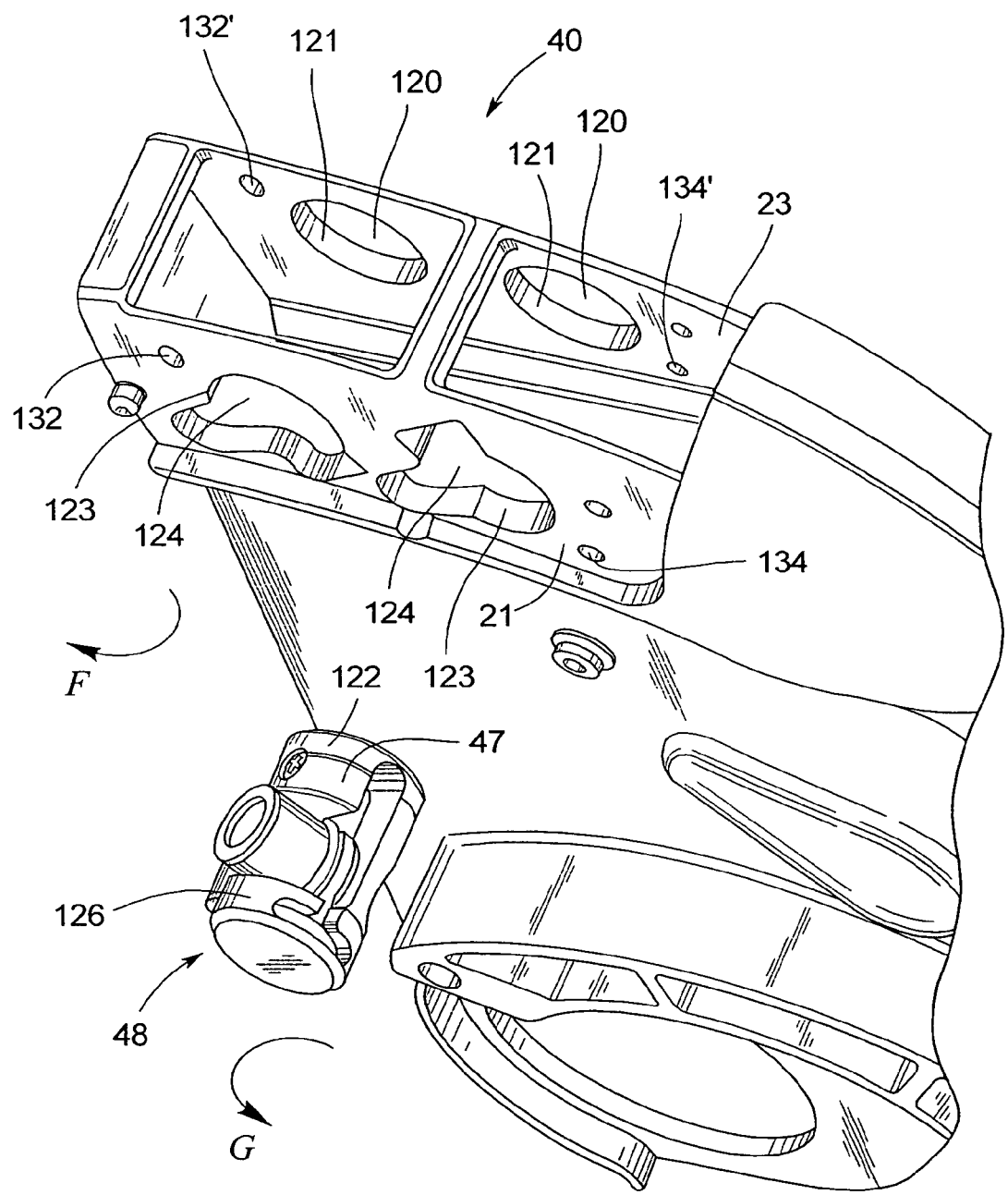
FIG. 7 is a partially exploded right side perspective view of the optical system of FIG. 3a with both laser generator holders removed.
Figure 8:
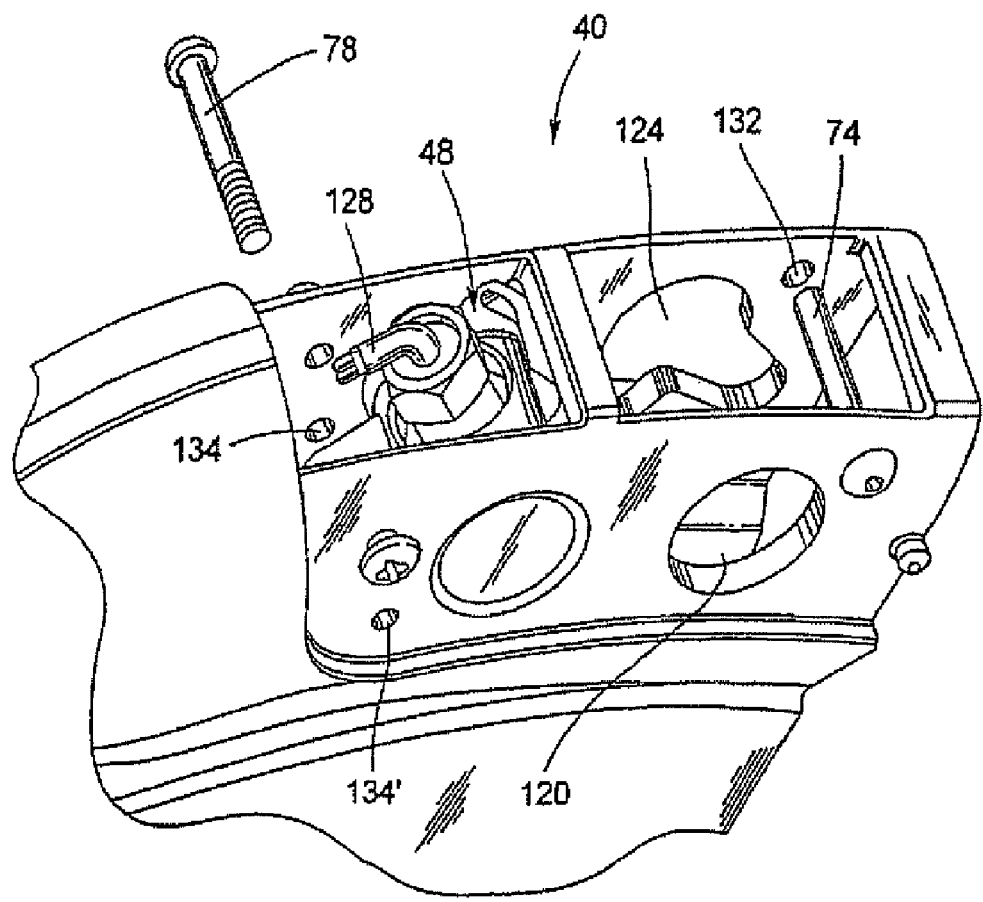
FIG. 8 is a left side perspective and partially exploded view of the optical system of FIG. 3a with one laser generator holder removed.
Figure 9:
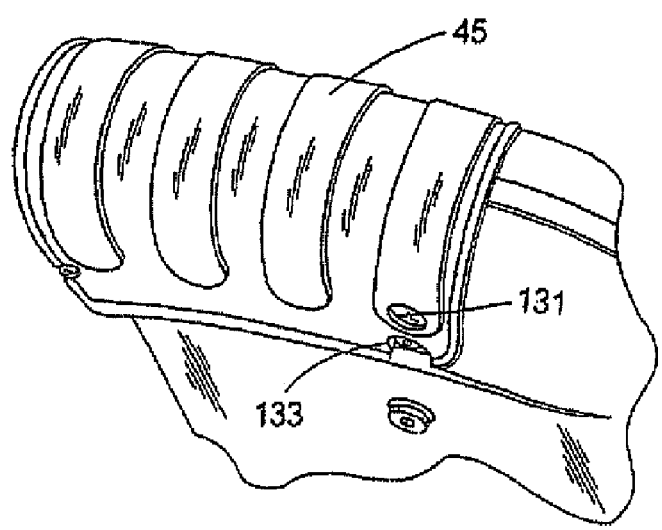
Figure 12B:
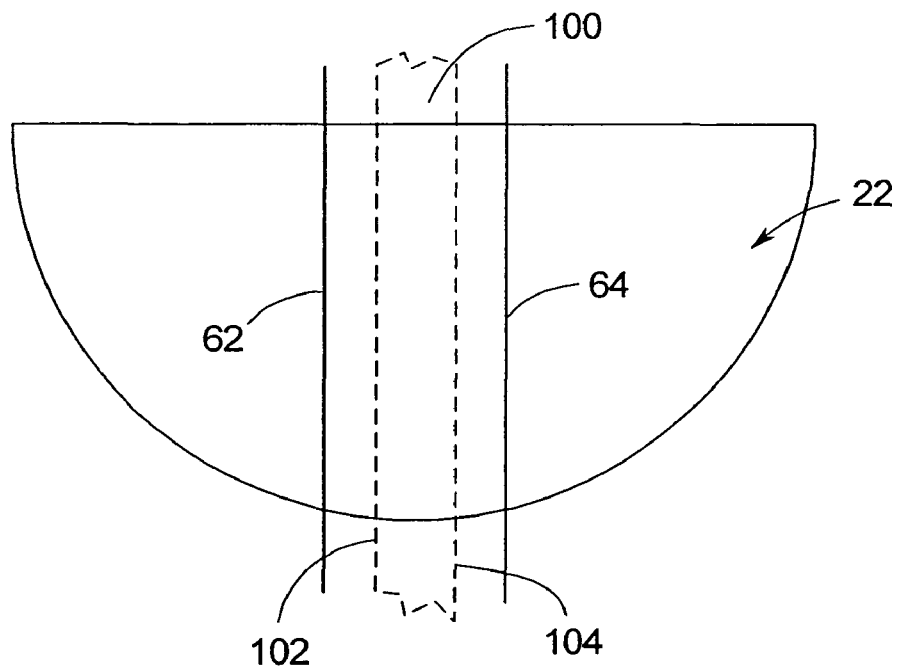
Figure 12C:
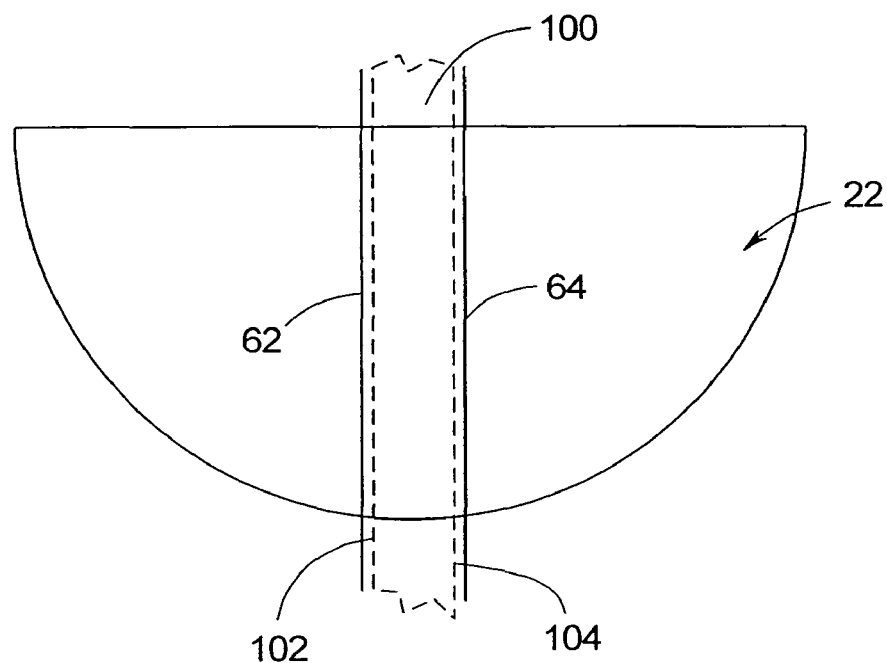

A lateral macro-adjustment may be provided by moving the holders 46, 48 laterally to accommodate the width of the blade 26 or the kerf 100 of the cut between the left and right indicator lines 62, 64, which are then laterally displaced with respect to the kerf 100, as shown in FIGS. 12b and 12c. To facilitate such adjustment, as can be seen in FIG. 3a, the first holder 46 may include a first threaded hole 66 parallel to its axis $A_1$-$A_1$ and a second threaded hole 70 oriented orthogonally to the first hole 66. Likewise, as can be seen in FIG. 4b, the second holder 48 may include a first threaded hole 68 parallel to its axis $A_2$-$A_2$ and a second threaded hole 72 oriented orthogonally to the first hole 68. First macro-adjustment actuators 74, 78, in the form, for example, of screws, may extend through holes 132, 132', 134, 134' in the left and right walls 23, 21 of the upper blade guard 28, and may be received in the respective first holes 66, 68 to move the respective holders 46, 48 laterally. The wall holes 132, 132', 134, 134' are aligned with the first threaded holes 66, 68. Macro-adjustment fasteners 80, 82, such as set screws, may be used to lock the macro-adjustment actuators 74, 78.

A lateral micro-adjustment of the indicator lines 62, 64 may be provided by supporting the laser generators 42, 44 on beams or sleeves 88 cantilevered from the holders 46, 48. See FIGS. 4a and 4b. In one embodiment, each laser generator 42, 44 may be supported on its respective holder 46, 48 inside a central opening 87 of a sleeve 88 which is received inside an opening 83 of the respective holder 46, 48. Each sleeve 88 may have first and second end tabs 90, 92 that protrude on each side of the sleeve, and may be cantilevered from its first end tab 90, which may be received, for example, in a cavity 91 of the respective holder 46, 48. It will be appreciated that other ways of supporting the laser generators 42, 44 on cantilevered beams 88 and mounting such beams 88 on the holders 44, 46 may be employed.

A micro-adjustment actuator 94, in the form of a screw or similar fastener, may be received in an opening 140 of the holder 46, 48. The micro adjustment actuator 94 may operate to exert force on the second end tab 92 of the sleeve 88 to cause the sleeve 88 to deflect and move in the directions indicated by arrows C relative to the respective axis $A_1$-$A_1$, $A_2$-$A_2$ of the holder 46, 48. The deflection of the sleeve 88 causes the respective laser generator 42, 44 to move in like manner, such that the respective indicator line 62, 64 is displaced parallel to itself. See FIG. 12d.

The micro-adjustment actuator 94 may be operated by rotating, for example, a hex nut 96. The sleeve 88 and the micro-adjustment actuator 94 may also be calibrated such that one full turn of the nut 96 corresponds to a predetermined amount of displacement. For example, in one embodiment, one full turn of the nut 96 corresponds to a lateral displacement of 1/32". Those of ordinary skill in the art will appreciate that one or more micro-adjustment operations may be required to bring the indicator lines 62, 64 onto the planes corresponding with the sides 50, 52 of the blade 26 depending on the proximity provided by a preceding macro-adjustment.

A biasing stopper 95 may be provided against the second end tab 92 of the sleeve 88 to bias the second end tab 92 toward a predetermined position, for example in contact with an inner surface 99 of the respective holder 46, 48. The stopper 95 may be made from any resilient material, such as, for example, rubber. It will be appreciated that other biasing arrangements or devices may be used, including, for example, ordinary coil springs. The biasing stopper 95 may be secured by a fastener 136, such as a set screw, or other supporting arrangement. The sleeve 88 may include a cavity 138 for receiving the frictional insert 86.

The laser light of the laser generators 42, 44 may pass through a bottom surface 31 of the lower guard 30, if such lower guard 30 is provided. The bottom surface 31 of the lower guard 30 may be constructed from materials having acceptable optical transmission properties, such as, for example, glass or polymer having a transparency index that minimizes distortion and/or dispersion of the laser light. Alternatively, the bottom surface 31 of the lower guard 30 may be provided with one or more openings 98, for example, a series of slits or louvers. See FIG. 1.

The openings 98, may be oriented substantially perpendicularly to a periphery 33 of the lower guard 30, as shown in FIG. 1, or parallel to the periphery 33. When the openings 98 are oriented perpendicularly to the periphery 33 of the lower guard 30, the indicator lines 62, 64 are projected as dashed lines on the base 22 or on the workpiece 25. See FIG. 10.

Figure 15:
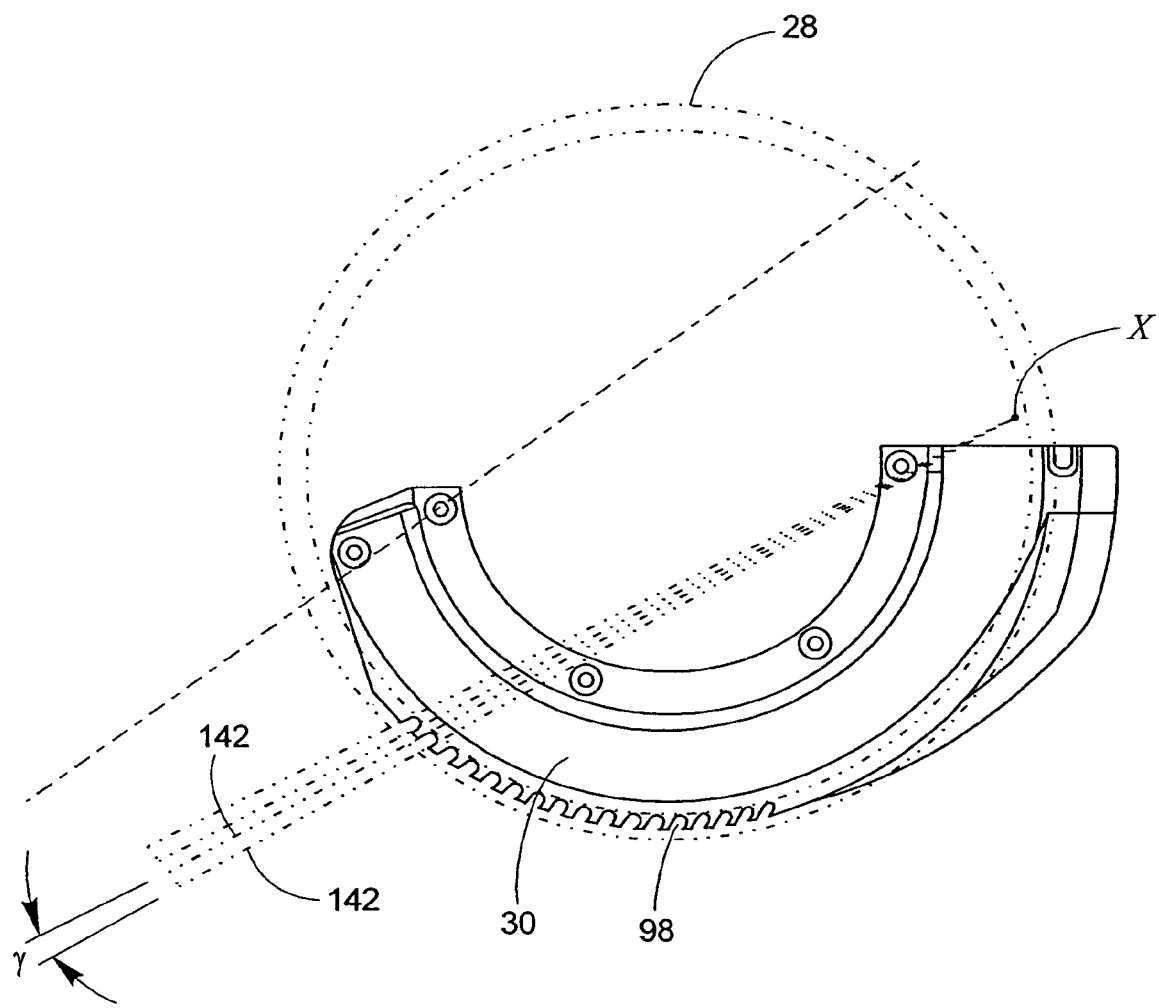
FIG. 15 is a side view of an embodiment of a lower guard for the cutter of FIG. 1.

In one embodiment, the shape of the openings 98 may be determined by drawing radial lines 142 emanating from a point "X" of the upper blade guard 28. Point X may be located, for example, midway between the first and second laser generators 42, 44. The angle ".gamma." between two adjacent radial lines 142 that define the lateral sides of the openings 98 may be adjusted to achieve a desired length and spacing of the dashes of the indicator lines 62, 64. See FIG. 15.

By operating the adjustment mechanisms described above, each of the indicator lines 62, 64 may be adjusted such that it is parallel to the first or second sides 50, 52 of the blade 26. Moreover, each indicator line 62, 64 may be manipulated to be tangent to one of the sides 50, 52 of the blade 26, or to fall within the width of the blade 26 (or the kerf 100), and therefore, within the width of the material to be removed by the blade 26. In the latter case, i.e., when the indicator lines 62, 64 are adjusted to fall within the kerf 100, certain portions of the indicator line 62, 64 may be obstructed by the blade 26 such that the indicator line 62, 64 may appear to be interrupted, i.e. having blank or shadowed portions. FIG. 11 illustrates an example in which the left indicator line 62 is interrupted by the width of the blade 26 (hitting a tooth insert), while the right indicator line 64 is uninterrupted and tangent to the right side 52 of the blade 26.

Figure 12D:
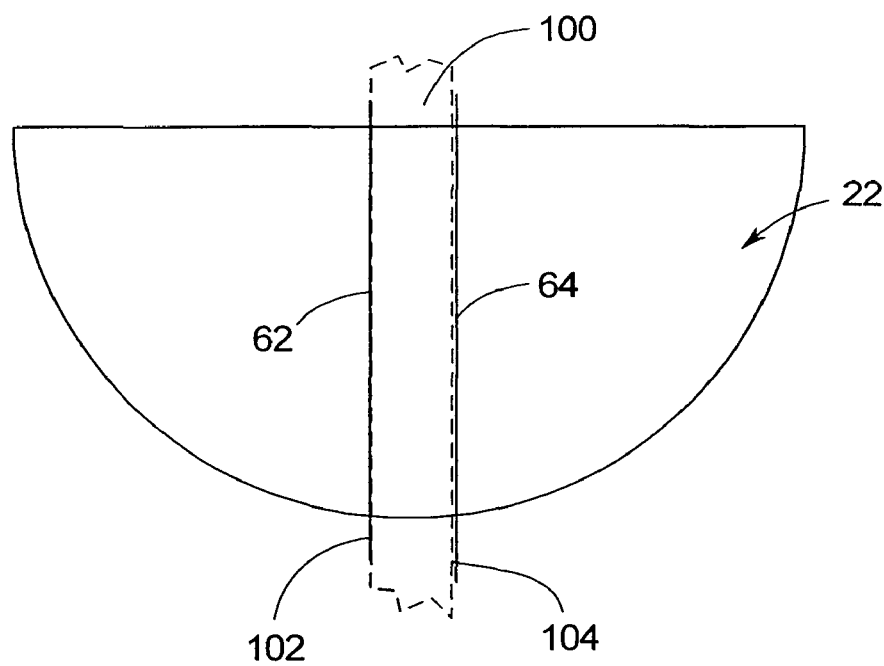

In operation, the optical system 40 may be powered to project two indicator lines 62, 64 near the sides 102, 104 of the kerf 100, as shown in FIG. 12a. Using the handle 84, each laser generator 42, 44 may be rotated about its longitudinal axis B-B until the corresponding indicator line 62, 64 becomes parallel to the corresponding side of the kerf 100. See FIG. 12b. The macro-adjustment actuators 74, 78 may then be operated to slide the corresponding holders 46, 48 toward or away from the blade 26, such that the indicator lines 62, 64 are on each side of kerf 100 and close to the kerf sides 102, 104. See FIG. 12c. Finally, the micro-adjustment actuators 94 may be operated to cause one or both indicator lines 62, 64 to coincide with the outer edges of the kerf sides 102, 104, as shown in FIG. 12d.

As explained in connection with FIG. 11, it is also possible, if desired, to bring the indicator line 62, 64 inside the kerf 100, for example against the inner edge of one of the kerf sides 102, 104. In such case, the corresponding indicator line 62, 64 may be partially interrupted or shadowed by a portion of the blade 26, as described in connection with FIG. 11.

Figure 13:
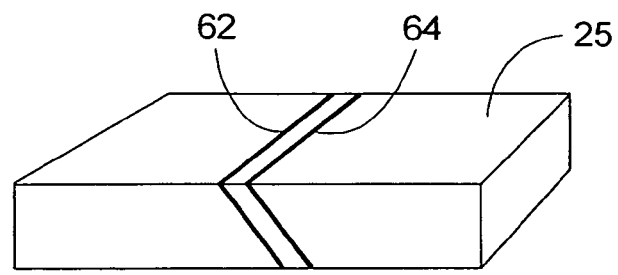
FIG. 13 is a perspective view of the projection of the indicator lines 62, 64 of the optical system of FIG. 3a for a slanted cut of the cutter of FIG. 1.

Further, for a cutter such as a miter saw, as the upper guard 28 is lowered to bring the blade 26 in cutting position, the lower guard 30 rotates to expose the blade 26. Accordingly, as the blade 26 is lowered, the indicator lines 62, 64 may change from dashed to solid as they no longer pass through the lower guard 30. Additionally, the indicator lines 62, 64 may also project on the side surface of the workpiece 25, indicating, for example, a straight or slanted cut and guiding vertical or slanted orientations of the blade 26. See FIG. 13.

Providing two laser generators 42, 44 with multiple and selectively operable adjustment mechanisms greatly facilitates the operation of cutting a workpiece 25 along a predetermined line and removing a predetermined amount of material. Such cutting operations may be performed accurately and conveniently using a variety of blades of different widths and teeth arrangements.

It will be understood that although the optical alignment system was described in reference to laser generators, other light sources capable of projecting distinctive indicator lines on the workpiece may be utilized in the spirit of the invention in connection parallelism, macro- and micro-adjustment mechanisms.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit invention. The preceding description, therefore, is not meant to limit the scope of the invention. Rather the scope of the invention is to be determined only by the appended claims and their equivalents.

What is claimed is:

1. A cutter comprising:
a base;
a housing movably mounted on the base and supporting a rotatable saw blade, the blade having first and second lateral sides, wherein the blade is rotatable about a rotation axis that is substantially perpendicular to said lateral sides, and wherein said blade is movable with the housing in a direction substantially perpendicular to the rotation axis for cutting; and
an optical system comprising a first laser generator adjustably supported on the housing for movement with the housing and a second laser generator adjustably supported on the housing for movement with the housing, wherein said first laser generator adjustably projects a first indicator line and said second laser generator adjustably projects a second indicator line apart from the first indicator line such that said first and second indicator lines cooperate to indicate the width of the blade.

2. The cutter of claim 1, wherein said first laser generator is mounted on a first holder supported on said housing and said second laser generator is mounted on a second holder supported on said housing.

3. The cutter of claim 2, wherein said first laser generator is disposed within said first holder at positions that are laterally offset from the first lateral side of the blade and wherein said second laser generator is disposed within said second holder at positions that are laterally offset from the second lateral side of the blade.

4. The cutter of claim 3, further comprising an adjustment mechanism operably coupled to said housing and said first holder, wherein said adjustment mechanism is selectively operable to laterally displace the first holder on said housing such that the first indicator line generated by said first laser generator is displaced laterally relative to the blade.

5. The cutter of claim 4, wherein said first holder supports a first micro-adjuster that is selectively operable to move said first laser generator within said first holder such that the first indicator line is laterally displaced relative to the first lateral side of the blade.

6. The cutter of claim 5, wherein said first micro-adjuster comprises:
a first sleeve cantilevered from said first holder and supportingly receiving said first laser generator therein; and
a first micro-actuator adjustably supported in said first holder and selectively operable to deflect the first sleeve relative to said first holder.

7. The cutter of claim 6, wherein the first sleeve is biased in a predetermined direction against said first holder.

8. The cutter of claim 3, further comprising an adjustment mechanism operably coupled to said housing and said second holder, wherein said adjustment mechanism is selectively operable to laterally displace the second holder on said housing such that the second indicator line generated by said second laser generator is displaced laterally relative to the blade.

9. The cutter of claim 8, wherein said second holder supports a second micro-adjuster that is selectively operable to move said second laser generator within said second holder such that the second indicator line is laterally displaced relative to the second lateral side of the blade.

10. The cutter of claim 9, wherein said second micro-adjuster comprises:
a second sleeve cantilevered from said second holder and supportingly receiving said second laser generator therein; and
a second micro-actuator adjustably supported in said second holder and selectively operable to deflect the second sleeve relative to said second holder.

11. The cutter of claim 10, wherein the second sleeve is biased in a predetermined direction against said second holder.

12. The cutter of claim 2, further including an adjustment mechanism operably coupled to the first laser generator, wherein the adjustment mechanism is configured to selectively rotate the first indicator line relative to the first lateral side of the blade.

13. The cutter of claim 12, further including a first frictional insert supported in said first holder and in frictional contact with said first laser generator.

14. The cutter of claim 2, further including an adjustment mechanism operably coupled to the second laser generator, wherein the adjustment mechanism is configured to selectively rotate the second indicator line relative to the second lateral side of the blade.

15. The cutter of claim 14, further including a second frictional insert supported in said second holder and in frictional contact with said second laser generator.

16. A cutter comprising:
a base;
a housing movably positioned on the base and supporting a saw blade, the blade having first and second lateral sides defining a width, said first lateral side defining a first plane and said second lateral side defining a second plane, wherein the blade is rotatable about a rotation axis that is substantially perpendicular to said lateral sides, and wherein said blade is movable with the housing in a direction substantially perpendicular to the rotation axis for cutting; and
an optical system adjustably supported on the housing for movement with the housing, the optical system having first and second laser emitters for adjustably projecting first and second indicator lines positioned apart from one another, the optical system including an adjustment mechanism connected to one of said first and second laser emitters, the adjustment mechanism being operable to adjust the corresponding one of said first and second indicator lines to indicate the boundary of said first plane or the boundary of said second plane.

17. The cutter of claim 16, wherein the other of said indicator lines is projected such that the distance between said first and second indicator lines is less than the width of the blade.

18. The cutter of claim 16, wherein the other of said indicator lines is partially obscured by the blade.

19. The cutter of claim 16, wherein the other of said indicator lines is projected such that the distance between said first and second indicator lines is greater than the width of the blade.

20. The cutter of claim 16, wherein the other of said indicator lines is projected such that the distance between said first and second indicator lines is equal to the width of the blade.

* * * * *